Jan. 19, 1943.    B. D. MICKEY    2,308,994

MOTOR CONTROL SYSTEM

Filed April 26, 1941

Inventor:
Bruce D. Mickey,
by Harry E. Dunham
His Attorney.

Patented Jan. 19, 1943

2,308,994

UNITED STATES PATENT OFFICE 2,308,994

MOTOR CONTROL SYSTEM

Bruce D. Mickey, Schenectady, N. Y., assignor to General Electric Company, a corporation of New York Application April 26, 1941, Serial No. 390,590

2 Claims. (Cl. 172—239)

My invention relates to motor control systems and more particularly to systems for controlling the speed of electric motors.

The usual direct current motor which has a considerable range of operating speed by means of field control will have a different speed regulation at full field speed than it has at weak field speed. That is, the change in speed from no load to full load will be different at different operating speeds. With the usual adjustments of brush position, interpole and stabilizing fields the percentage change at full field speed will ordinarily be higher than at weak field speed. For many applications it is desirable to keep the speed regulation of an adjustable speed motor as small as possible at all operating speeds. In other applications it is desirable to maintain the same percentage change in speed from no load to full load at all operating speeds.

An object of my invention is to provide an improved arrangement whereby the speed regulation of an electric motor may be automatically maintained as small as possible.

A further object of my invention is to provide an improved arrangement whereby the percentage of speed change from no load to full load for different operating speeds may be automatically maintained substantially the same.

In accordance with my invention I control the speed of the motor by a novel and improved regulating means acting automatically to vary the motor field excitation. The regulating means comprises a pilot or auxiliary generator driven at a speed proportional to the motor speed which is connected to energize the field of the motor. Changes in speed of the motor results in changes of the output voltage of the auxiliary generator so that the motor field excitation is changed in a direction to return the motor speed to normal. Connected in series with the motor field winding is a negative impedance-current characteristic impedance which makes the field circuit very sensitive to voltage changes of the auxiliary generator so that the motor speed is held substantially constant. In a modified arrangement the auxiliary generator is provided with a field winding energized in proportion to the motor load current to give the motor a predetermined speed-load characteristic.

My invention will be better understood from the following description taken in connection with the accompanying drawing and its scope will be pointed out in the appended claims.

Figure 1:
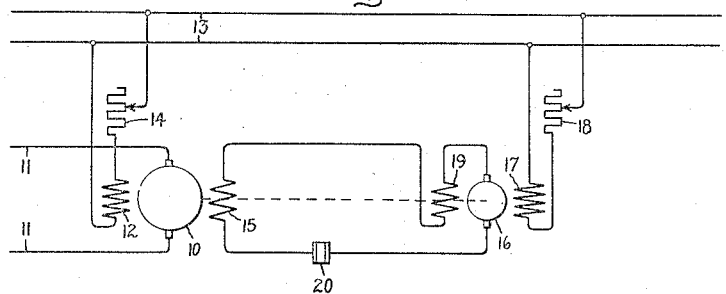
Figure 2:
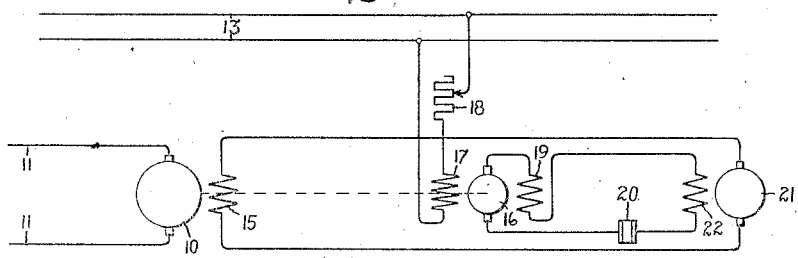
Figure 3:
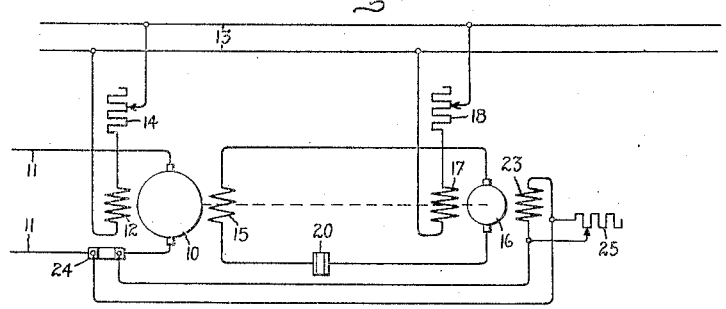

In the drawing, Fig. 1 is a diagrammatic showing of a speed control system for a direct current motor embodying my invention; Fig. 2 is a modification of the arrangement shown in Fig. 1 utilizing two auxiliary generators; and Fig. 3 shows an arrangement for varying the motor speed in accordance with the motor load.

Referring to Fig. 1 of the drawing, I have shown a variable speed direct current motor 10 having its armature connected to power supply mains 11. The motor 10 has a field winding 12 connected to any suitable constant potential source 13 and has connected in series therewith a field rheostat 14 for the purpose of varying the speed of the motor. The motor 10 has a second field winding 15 which is connected to the armature of a pilot or auxiliary direct current generator 16 which is driven at a speed proportional to the motor speed. The auxiliary generator 16 is illustrated as being directly driven by the motor 10 but it will be understood that the auxiliary generator could be mounted on a separate shaft connected to the motor shaft by suitable positive driving means. The generator 16 has a field winding 17 connected to be energized from the constant potential source 13 and has connected in series therewith a field rheostat 18. In certain cases it is desirable to provide the auxiliary generator 16 with a series field winding 19 for a purpose which will be described below. Motor field windings 12 and 15 are arranged to produce flux in the same direction, two windings being used in order to give greater flexibility in the control of the motor speed. However, if desired, the winding 12 may be omitted entirely and the total motor field flux may be supplied by the winding 15.

Connected in series with the motor field winding 15 is a negative impedance-current characteristic impedance element 20. By a negative impedance-current characteristic impedance I mean an impedance whose ohmic value decreases with increases in current therethrough or voltage thereacross. Many such impedance devices are known in the art. For example, there are impedance devices of this character which operate through temperature changes. Thus certain forms of carbon and boron have negative temperature coefficients of resistance and increases in current through these elements raise their temperature and thus cause a reduction in their electrical resistance. While my invention is not limited to any particular type of negative-impedance current characteristic impedance device, I prefer at present to use the special ceramic resistance material which is disclosed and claimed in Patent 1,822,742, granted September 8, 1931, on an application of K. B. McEachron, and assigned to the assignee of the present application. This material has the property of substantially instantaneously reducing its electrical resistance with increases in current through it or voltage across it and its resistance is substantially independent of its temperature.

The operation of the embodiment of my invention illustrated at Fig. 1 will now be described. Let it be assumed that the field rheostats 14 and 18 are adjusted so that the motor 10 is running at some desired speed to be maintained. If, for any reason, such as an increased voltage of the power supply mains 11 or a decrease in load on the motor 10 the motor should tend to speed up, the voltage of the auxiliary generator increases since its voltage is proportional to the speed of the motor. This increase in voltage of the auxiliary generator 16 causes a disproportionately large change in the current in the motor field winding 15 due to the fact that the impedance of the impedance element 20 decreases with an increase in current flow therethrough. The increase in motor excitation produced by the winding 15 causes the motor speed to slow down and return substantially to its original value. Similarly, if for any reason the motor speed should fall below the predetermined value to be maintained the voltage of the auxiliary generator decreases causing a decrease in the current flowing through the motor field winding 15. A decrease in field current causes an increase in the impedance of the element 20 whereby the field current is still further decreased so that the motor speed increases and returns substantially to its original value. If the impedance element 20 is of the type whose resistance changes with temperature the corrective action will be relatively slow. However, if the impedance element 20 is made of material having a negative current resistance characteristic without the appreciable temperature dependence such as described in the above mentioned McEachron patent, the action will be substantially instantaneous and will follow the exponential law $RI^A = C$ where R is the resistance, I is current, A is the exponent, and C is a constant. By suitably choosing the exponent A and the constant C the regulating circuit may be made extremely sensitive to very small changes in speed of the motor 10 so that over a relatively wide range of supply voltage and motor load variation in the speed of the motor will be held within close limits.

The series field winding 19 of the auxiliary generator 16 is not essential but may be used in cases where it is desirable to hold the speed of the motor 10 within very close limits. The field 19 is wound accumulatively with the field winding 17 so that both fields tend to produce flux in the same direction. Thus a voltage change of the auxiliary generator 16 due to a change in speed of the motor 10 is amplified by the action of the series field so that greater sensitivity in the regulating action is obtained.

The motor 10 may be made to run at any desired speed by suitable adjusting the field rheostats 14 and 18 and the regulating apparatus will act to keep the speed regulation of the motor within small limits at all operating speeds.

With large size motors the field current may be so high that it is difficult to provide a reasonably sized impedance element 20 which will dissipate the necessary amount of heat to prevent overheating. In such a case the arrangement indicated in Fig. 2 of the drawing may be utilized. In this arrangement a second auxiliary direct current generator 21 is used to supply the current to the motor field winding 15. The generator 21 has a field winding 22 which is connected to the armature of the generator 16 in series with the impedance element 20. The generator 21 acts as an amplifier of the current variations in the circuit including field winding 22 so that the desired regulating action can be obtained with a much smaller current flowing through the impedance element 20.

In Fig. 3 of the drawing I have shown an arrangement whereby the motor speed maintained by the regulating apparatus may be made to vary in a predetermined manner with variations in the load current drawn by the motor. In this arrangement the auxiliary generator 16 is provided with a compounding winding 23 which is energized in accordance with the current flowing in the motor armature circuit. The winding 23 may be connected directly in series with the armature of the motor 10 or it may be connected indirectly in series with the motor armature as shown by means of a shunt 24. An adjustable rheostat 25 is connected across the winding 23 to adjust the current flow therethrough. This arrangement is otherwise the same as shown in Fig. 1.

In operation as long as the motor load current does not change the regulating apparatus will hold substantially constant speed as before. With changes in load current, however, the excitation of the auxiliary generator 16 is changed. This means that with no change in speed of the generator 16 the motor excitation is changed and consequently the motor speed will change to a new value. The regulating apparatus will then act in a direction to counteract this speed change, the net result being a compromise new speed but one that will then be maintained substantially constant for a given motor load current. The advantage of this arrangement is that the amount of compounding with load change is to a large extent independent of the inherent speed regulation characteristic of the motor itself. Thus by adjusting the resistor 25 it is possible to get any desired relationship between the motor load and speed. If it is desired to have the motor speed decrease with load the winding 23 of the generator 16 is connected so that the compounding is cumulative. On the other hand, if it is desired to have motor speed increase with increases of load the winding 23 is connected so that the compounding is differential. By suitably proportioning the field rheostats 14, 18 and 25 and operating them jointly the same percentage change in speed from no load to full load at all operating speeds may be obtained within very close limits.

While I have shown and described particular embodiments of my invention it will occur to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States is:

1. In combination, an electric motor having a field winding, an auxiliary generator having a pair of field windings, said generator being arranged to be driven by said motor and having its armature connected to energize the field winding of said motor, a negative impedance current characteristic impedance material connected in series with the field winding of said motor, means for providing substantially constant energization of one of the field windings of said auxiliary generator, and means for energizing the other field winding of said auxiliary generator in accordance with the load current drawn by said motor.

2. In combination, an electric motor having a field winding, an auxiliary generator having a pair of field windings, said auxiliary generator being arranged to be driven by said motor, a circuit including the armature of said auxiliary generator, a negative impedance-current characteristic impedance material connected in series with said circuit, means for energizing the field winding of said motor in accordance with the current in said circuit, means for providing substantially constant energization of one of the field windings of said auxiliary generator, and means for energizing the other field winding of said auxiliary generator in accordance with the load current drawn by said motor.

BRUCE D. MICKEY.